Feb. 28, 1956   L. KRAUSS   2,736,095
VOLUME MEASURING DEVICE
Filed July 19, 1954
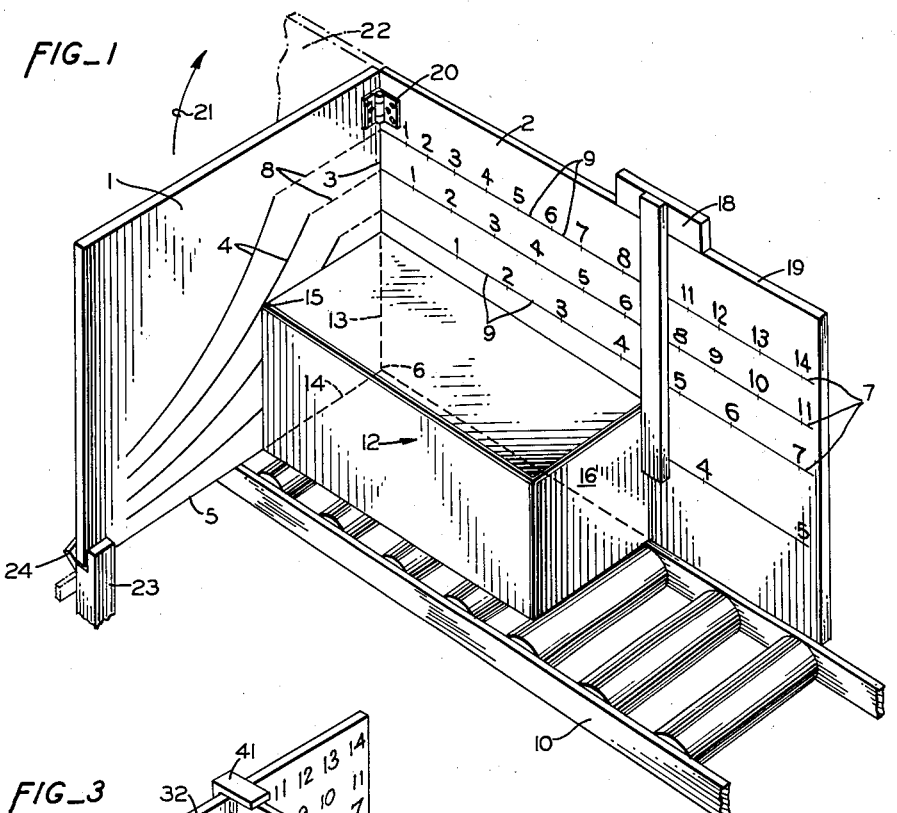
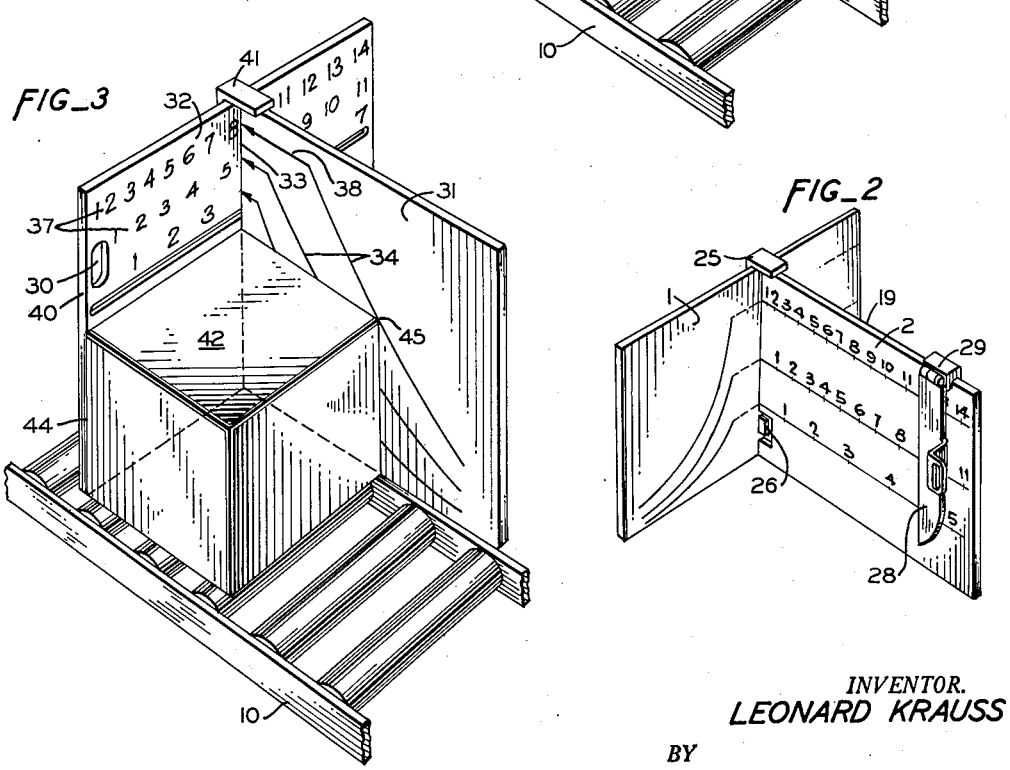
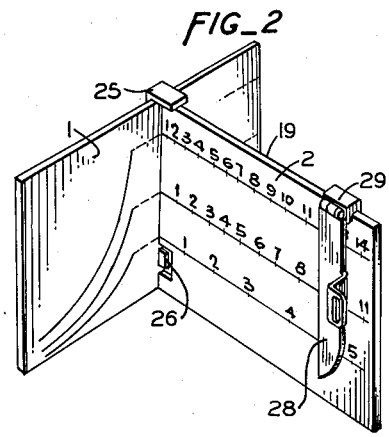
INVENTOR.
LEONARD KRAUSS
BY
Boyken, Mohler & Wood
ATTORNEYS United States Patent Office 2,736,095
Patented Feb. 28, 1956

2,736,095

VOLUME MEASURING DEVICE

Leonard Krauss, San Francisco, Calif., assignor to Regents of The University of California, Berkeley, Calif., a corporation of California Application July 19, 1954, Serial No. 444,269

8 Claims. (Cl. 33—1)

This invention relates to a volume measuring device and more particularly to a simple device which automatically calculates the volume of shipping containers and the like.

In the handling and shipping of articles in rectangular containers the volume of such containers is an important factor to be considered from the standpoint of cost. It is also often necessary that the transporting agency determine the volume of such containers so that the same may be economically arranged and transported.

Heretofore the following conventional methods have been used for determining the volume of shipping containers and the like. When standard shipping containers have been used a single volume calculation has been made from the individual dimensions of one container and the volume of further containers reported without repeating the measurement and calculation steps. Possibilities for errors occurred either when the original calculation was incorrect or a container was mistaken for one of another standard size.

For the calculation of volume when the measurements were known it has been common practice to use a commercial "cube book." This book consists of a series of multiplication tables arranged in sequence. The book is opened to a page which is marked to correspond to one of the dimensions of the container. On that page there is a multiplication table; the volume in cubic feet to the nearest twelfth is to be found in the column headed by the second dimension and in the row opposite the third dimension of such container. Although use of this book has been standard procedure, errors have been frequently made. These errors may be due either to an incorrect recording of the measurements and/or to improper use of the book.

The method of long hand calculation or converting the dimensions to fractions and multiplication thereof to obtain volume has also been used. This method has seldom been utilized, however, as it is considered too slow and complex by persons working on the packing lines. The high chance of error is obvious.

Many packing lines have used "cube sticks" which are slide rule devices having a scale along one surface thereof to measure the container. The three dimensions thus obtained have to be recorded on paper or in the mind, and the stick then turned over and used like a conventional slide rule. Circular slide rules having logarithmic scales have also been used to multiply the three dimensions of a container to find the volume thereof. The usual chance for error is apparent in measurement of the dimensions and unless great care is exercised improper usage of the slide rule introduces other errors.

In order to eliminate the sources of errors made in determining the volume of shipping containers and like, the device of this invention contemplates the use of a set of scales which permit the volume of such container to be read directly without individual measurements of the container dimensions or calculations based thereon. It is therefore an object of this invention to provide an inexpensive device for simply and rapidly indicating the volume of a rectangular solid.

It is another object of this invention to provide a device, adaptable for use on a packing line, for automatically calculating the volume of shipping containers and the like.

A further object of this invention is the provision of a volume measuring device which eliminates the measurement of individual linear dimensions of the object to be measured and calculations based thereon, thereby eliminating errors in volume measurement of such object.

Yet another object of this invention is the provision of a device, making use of hyperbolic curves and related scales, for indicating volume of shipping containers and the like, which device is characterised by simplicity of construction and usage.

Other objects and advantages will become apparent from the following description taken in connection with the accompanying drawings in which:

Fig. 1 is a perspective view of one form of the device of this invention in use with a conveyor;

Fig. 2 is a perspective view of another form of the device of Fig. 1 showing a modification of the mounting of one of the scale surfaces;

Fig. 3 is a perspective view of still another form of the device of this invention showing the position of the scale surfaces reversed with respect to the conveyor.

In detail, referring to Fig. 1, the device of this invention is seen to comprise a pair of vertical plates 1, 2 intersecting at right angles along a common line 3. Plate 1 has inscribed or marked thereon a plurality of curves 4 which are equilateral or rectangular hyperbolas having common origin lines or asymptotes 3, 5 (corresponding to the intersection of plates 1 and 2 and the lower plate edge of plate 1 respectively) and a common origin point 6, being the intersection of said asymptotes. Each curve 4 is characteristically the locus of points of equal-area rectangles bounded by asymptotes 3, 5 and a pair of lines each parallel to one of said asymptotes and intersecting at each of said points.

Plate 2 has a plurality of lines or scales 7 marked thereon extending perpendicular to intersection 3 and each of which is related, by means of dotted lines 8, to one of curves 4. Said scales may also be related to said curves by means of different identifying colors, each related curve and scale being of the same color. Each scale 7 is divided along its length into incremental distances 9 each of which is equal to the reciprocal of the rectangular area under the related curve 4. Incremental distances 9 are progressively numbered in whole numbers from intersection 3 and may be further divided to provide greater accuracy of measurement as will be more fully described.

A container-supporting surface or conveyor 10 has its upper run perpendicular to both plates 1 and 2 and intersects plate 1 at edge of asymptote 5. While plate 2 may be mounted alongside and parallel to the direction of run of conveyor 10, plate 1 will be seen to extend across conveyor 10 and perpendicular to the direction of run thereof.

In measuring a shipping container or rectangular box 12 with the device of this invention, said box is placed on said conveyor with two of its adjoining surfaces touching plates 1, 2 so that one of its leading edges 13 is adjacent asymptote 3. Another leading edge 14 of said box will be seen to be adjacent asymptote 5 because of the position of the upper run of conveyor 10. Hence, the curve 4 nearest the corner 15 of box 12 opposite the intersection of edges 13, 14 will be indicative of the area of the end of box 12 touching plate 1. By following the dotted line 8 from such curve 4 to the related scale 7 on plate 2 the volume of box 12 is determined on such scale directly above the trailing end 16 of said box.

In constructing any one of the curves 4, for example the one for an end area of 6¼ square feet, several possible combinations of dimensions giving such area are plotted on plate 1 from asymptotes 3, 5 and one smooth curve drawn through them, or a mechanical procedure for producing an equilateral hyperbola may be used. Then any box whose corner 15 falls on this curve has an end area of 6¼ square feet. The incremental distances 1, 2, 3, 4 etc. for the related scale 7 are marked therealong at intervals of 0.16 feet starting from asymptote or intersection 3. The number 0.16 is the reciprocal of 6¼, thus the trailing edge of a box 4 feet long whose forward corner 15 falls on the curve of this example would be opposite the number 25 on such a scale indicating a volume of 25 cubic feet (4 times 6¼). The incremental distance between each pair of scale numbers may be marked off by ten equally spaced vertical marks to indicate tenths of a cubic foot for greater accuracy. Incremental distances 9 will of course differ for each different scale 7. For example, when a box 10" x 16" on the end locates a curve, the related scale will have numbers 0.9 feet apart.

The placement of T-square 18 along the upper edge 19 of plate 2 parallel to the upper run of conveyor 10 facilitates the alignment of trailing end 16 of box 12 with the volume indication on the appropriate scale 7.

In order that plate 1 does not hinder the efficient flow of boxes 12 along conveyor 10, plate 1 may be movably secured to plate 2 as by hinges 20. In this manner plate 1 may be swung in a direction shown by arrow 21 to an inoperative position, shown by dot-dash line 22 (Fig. 1), parallel to plate 2. A stop or guide 23 and latch 24 is provided so as to insure that plate 1 is at right angles to plate 2 in the operative position.

Alternatively, plate 1 (Fig. 2) may be mounted in guides 25 so as to be longitudinally slidable transversely of plate 2. In this event, a stop or guide 26, extending outwardly of plate 1 from asymptote 3 and parallel to plate 2, may be provided for contacting the side wall of box 12 adjacent edge 13 and thereby bringing plates 1 and 2 into the correct relationship for measuring the volume as above described.

Also shown in Fig. 2 is measuring edge 28 which performs the function of T-square 18 but may be hinged to slide 29, which is slidable on edge 19 of plate 2, for swinging out of the way of boxes 12 riding on conveyor 10. It is obvious that other methods of mounting plates 1, 2 and measuring edge 28 or T-square 18 may be used consonant with the volume measuring operation as above described.

In the modification shown in Fig. 3, plates 31, 32 (corresponding to plates 1 and 2 of Figs. 1, 2) are reversed with respect to conveyor 10. Plates 31, 32 intersect at asymptote 33 of curves 34 (on plate 31) and are similar in all respects to plates 1, 2 except that scales 37 (on plate 32) have their origin at edge 40 of plate 32 removed from asymptote 33. Plate 32 is slidable transversely of plate 31 in guides 41 and may be provided with handle 30 to facilitate sliding plate 32 across conveyor 10. Each curve 34 is related to one of scales 37 by means of horizontal indicator lines 38 in a manner similar to lines 8 of Figs. 1, 2.

In operation, a box 42 is similarly placed adjoining plates 31, 32 and the curve 34 nearest trailing corner 45 of said box is followed via line 38 to the related scale 37. Edge 40 of plate 32 is placed adjacent the forward edge 44 of box 42 that is opposite plate 31, and the intersection of the line 38 being followed and the appropriate scale 37 (at intersection 33) indicates the volume of box 42 on such scale.

The capacity of the volume measuring device in any of its modifications is as large as the largest box it is feasible to place on the conveyor. As a practical matter, it is best to orient the box being measured with its greatest length along the conveyor parallel to the fixed plate 2 or 31 so that the size of plates 1, 32, which must be moved into and out of position for each box, may be kept as small as possible. It has been found that accuracy to the nearest tenth of a cubic foot of volume can be easily achieved by curves 4 approximately one-half inch apart on plate 1 or 31.

Although this invention has been described and illustrated in detail, such is not to be taken as restrictive thereof as it is obvious that modifications could be made therein without departing from the spirit and scope of the invention.

I claim:

1. A device for measuring the volume of solids of regular cross-section throughout their length comprising a first plate having an origin point, an origin line, and a plurality of indicating lines marked thereon, each said indicating line being the locus of predetermined points on regular plane figures of equal area located with reference to said origin point and said origin line, a second plate perpendicular to and intersecting said first plate along said origin line and having a plurality of scales marked thereon, each of said scales being identified with one of said indicating lines and having increments equal to the reciprocal of said area related to said one indicating line whereby, when the cross-section of a solid of the type described is so referenced with respect to said origin point and said origin line and with its predetermined point on said one indicating line, the volume of said solid is indicated on the said scale related to said one indicating line opposite a second predetermined point on said solid.

2. A device for measuring the volume of rectangular solids comprising a first member with a plane surface provided with a plurality of equilateral hyperbolas marked thereon, said hyperbolas having common asymptotes, a second member provided with a plane surface normal to and intersecting said surface of said first member along one of said asymptotes and having a plurality of scales marked thereon, each said scale being related to one of said hyperbolas and having incremental distances equal to the reciprocal of the rectangular area under said one hyperbola whereby the volume of a rectangular solid placed with two of its intersecting edges along said asymptotes is indicated on the said scale related to the said hyperbola nearest the corner of said solid opposite said intersecting edges.

3. A device for measuring the volume of rectangular solids comprising a first member with a plane surface provided with a plurality of equilateral hyperbolas marked thereon, said hyperbolas having common asymptotes, a second member provided with a plane surface normal to and intersecting said surface of said first member along one of said asymptotes and having a plurality of scales marked thereon, each said scale being related to one of said hyperbolas and having incremental distances equal to the reciprocal of the rectangular area under said one hyperbola and progressively numbered from said one asymptote in whole numbers, said scales extending perpendicular to said intersection whereby the volume of a rectangular solid placed with two of its intersecting edges along said asymptotes is indicated at the end of said solid removed from said first member on the said scale related to the said hyperbola nearest the corner of said solid opposite said intersecting edges.

4. A device for measuring the volume of rectangular solids comprising a first member with a plane surface provided with a plurality of equilateral hyperbolas marked thereon, said hyperbolas having common asymptotes, a second member provided with a plane surface normal to and intersecting said surface of said first member along one of said asymptotes and having a plurality of scales marked thereon extending perpendicular to said one asymptote, each said scale being related to one of said hyperbolas and having incremental distances equal to the reciprocal of the rectangular area under said one hyperbola, a third member having a supporting surface normal to both said plane surfaces and coplanar with the other of said asymptotes for supporting said solids during measurement whereby the volume of a rectangular solid placed on said surface with two of its intersecting edges along said asymptotes is indicated at the end of said solid removed from said first member on the said scale related to the said hyperbola nearest the corner of said solid opposite said intersecting edges.

5. A device for measuring the volume of rectangular boxes comprising a first plate provided with a plurality of equilateral hyperbolas marked thereon, said hyperbolas having common asymptotes, a second plate normal to and intersecting said first plate along one of said asymptotes and having a plurality of scales marked thereon extending perpendicular to said one asymptote, each said scale being related to one of said hyperbolas and having incremental distances equal to the reciprocal of the rectangular area under said one hyperbola, a conveyor having its upper run normal to both said plates and coplanar with the other of said asymptotes for supporting said boxes during measurement, one of said plates being withdrawable from a position extending across said conveyor whereby the volume of a box supported on said conveyor with two of its intersecting edges along said asymptotes is indicated at the end of said box removed from said first plate on the said scale related to the said hyperbola nearest the corner of said box opposite said intersecting edges.

6. A device for measuring the volume of regular, rectangular boxes comprising a first plate provided with a plurality of equilateral hyperbolas marked thereon, said hyperbolas having common asymptotes intersecting at the origin thereof, a second plate hingedly connected to said first plate along one of said asymptotes and having a plurality of lines marked thereon extending perpendicular to said one asymptote, each line being connected to one of said hyperbolas and having numbered volume increments marked thereon equal to the reciprocal of the rectangular area encompassed by the said asymptotes and a pair of lines each parallel to one of said asymptotes nd intersecting said one hyperbola at a point, a conveyor having its upper run normal to both said plates and coplanar with the other of said asymptotes for supporting said boxes during measurement, the direction of run of said conveyor being parallel to said second plate, and guide means for positioning said first plate normal to said second plate whereby when a box on said conveyor is placed with one of its edges along the intersection of said plates the number nearest the end of said box opposite said first plate on the line connected to the hyperbola nearest the corner of said box opposite said origin indicates the volume of said box.

7. A device for measuring the volume of regular, rectangular boxes comprising a first plate provided with a plurality of equilateral hyperbolas marked thereon, said hyperbolas having common asymptotes intersecting at the origin thereof, a second plate hingedly connected to said first plate along one of said asymptotes and having a plurality of lines marked thereon extending perpendicular to said one asymptote, each line being connected to one of said hyperbolas and having numbered volume increments marked thereon equal to the reciprocal of the rectangular area encompassed by the said asymptotes and a pair of lines each parallel to one of said asymptotes and intersecting said one hyperbola at a point, a conveyor having its upper run normal to both said plates and coplanar with the other of said asymptotes for supporting said boxes during measurement, the direction of run of said conveyor being parallel to said second plate, and guide means for positioning said first plate normal to said second plate whereby when a box on said conveyor is placed with one of its edges along the intersection of said plates the number nearest the end of said box opposite said first plate on the line connected to the hyperbola nearest the corner of said box opposite said origin indicates the volume of said box, and a measuring edge parallel to said intersection of said plates for relating said end of said box to said number.

8. A device for measuring the volume of regular, rectangular boxes comprising a first plate provided with a plurality of equilateral hyperbolas marked thereon, said hyperbolas having common asymptotes, a second plate slidably mounted normal to and intersecting said first plate along one of said asymptotes and having a plurality of lines marked thereon extending perpendicular to said one asymptote, each said line being related to one of said hyperbolas and having numbered volume increments marked thereon equal to the reciprocal of the rectangular area encompassed by the said asymptotes and a pair of lines each parallel to one of said asymptotes and intersecting said one hyperbola at a point, a conveyor having its upper run normal to both said plates and coplanar with the other of said asymptotes for supporting said boxes during measurement, the direction of run of said conveyor being parallel to said first plate, and said increments being progressively numbered from an edge of said second plate parallel to said one asymptote whereby when a box supported on said conveyor is placed with one of its edges along the intersection of said plates and said edge of said second plate is placed adjacent an opposite edge of said box the number nearest the intersection of said plates on the line related to the hyperbola nearest the corner of said box opposite the intersection of said asymptotes indicates the volume of said box.

References Cited in the file of this patent

UNITED STATES PATENTS

| | | |
|---|---|---|
| 990,385 | Pierce | Apr. 25, 1911 |
| 1,853,198 | Breaden | Apr. 12, 1932 |
| 2,688,878 | Kolisch | Sept. 14, 1954 |

FOREIGN PATENTS

| | | |
|---|---|---|
| 290,181 | Great Britain | Nov. 1, 1928 |
| 507,817 | Great Britain | June 21, 1939 |